UNITED STATES PATENT OFFICE.

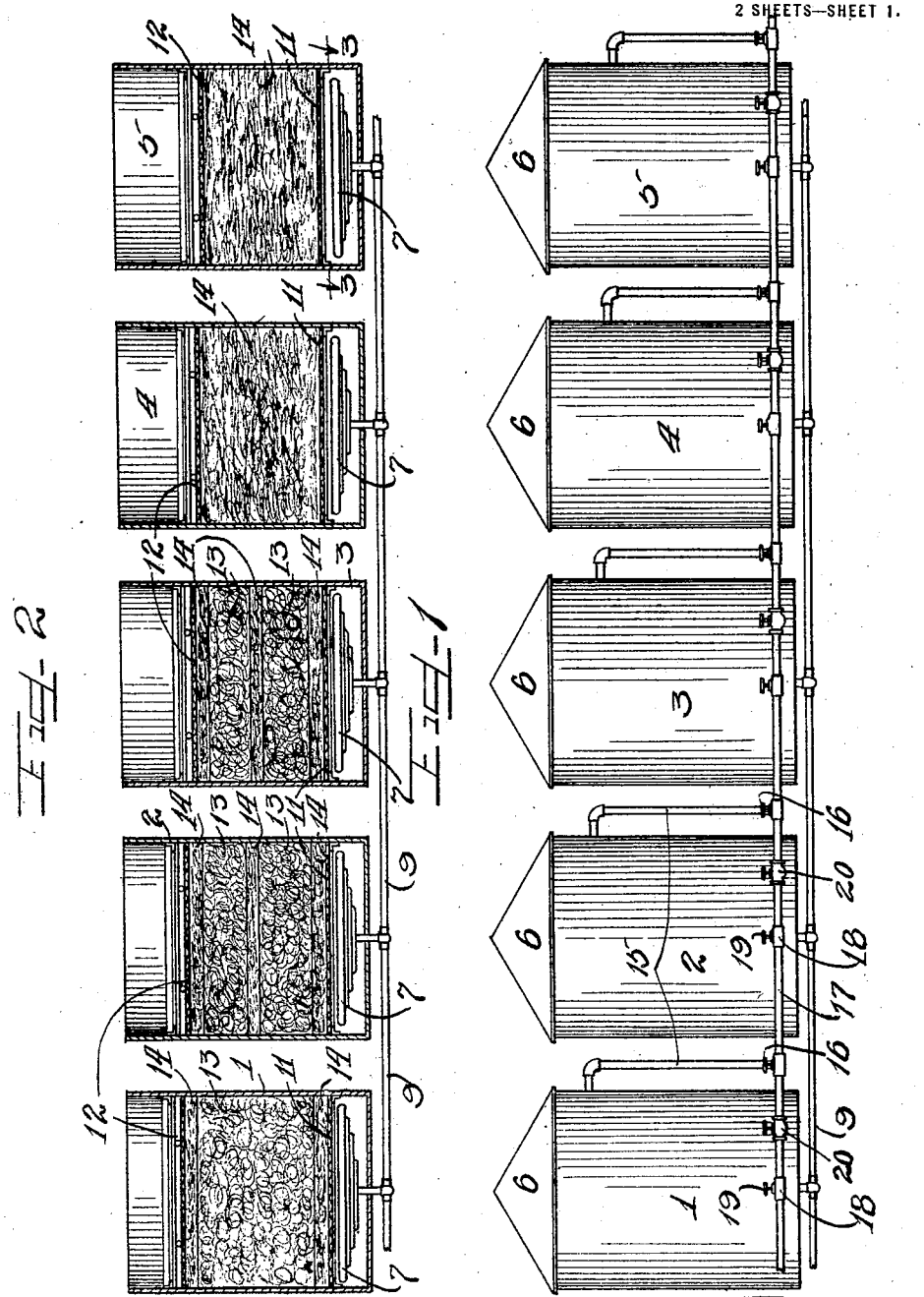

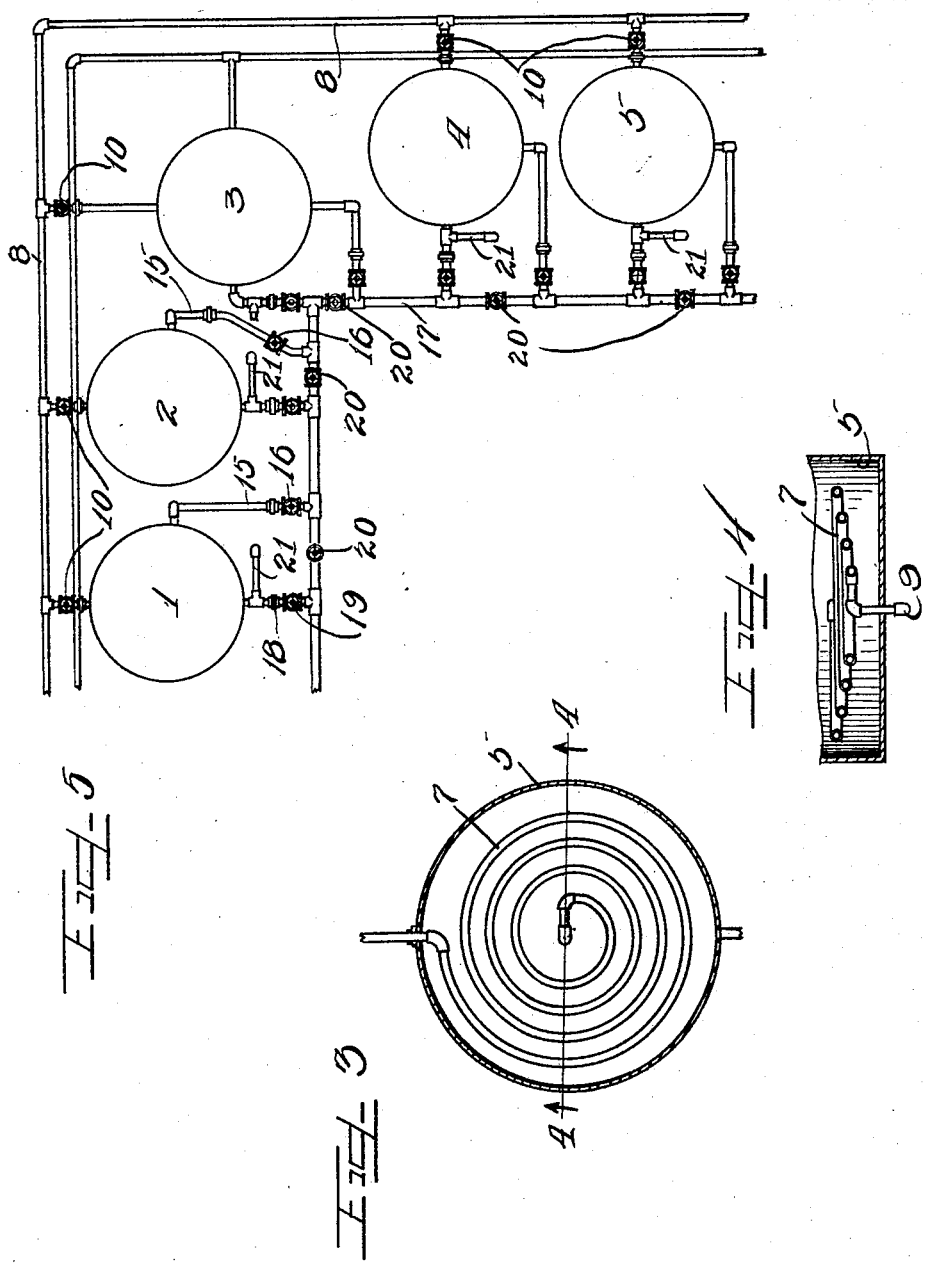

HENRY A. HILLS, OF GRAND RAPIDS, MICHIGAN.

MULTISTAGE ADJUSTABLE FILTERING APPARATUS.

1,328,045.            Specification of Letters Patent.       Patented Jan. 13, 1920.

Application filed May 7, 1917. Serial No. 167,014.

*To all whom it may concern:*

Be it known that I, HENRY A. HILLS, a citizen of the United States, and a resident of the city of Grand Rapids, in the county of Kent and State of Michigan, have invented certain new and useful Improvements in Multistage Adjustable Filtering Apparatus; and I do hereby declare that the following is a full, clear, and exact description of the same, reference being had to the accompanying drawings, and to the numerals of reference marked thereon, which form a part of this specification.

This invention relates to a filtering apparatus wherein a number of separate units are interconnected with one another so that the fluid to be filtered is caused to flow successively therethrough, and with said units so interconnected that any one thereof may be cut out for cleaning purposes, and all may be arranged in different relations to secure economy in space of installation or conform to the arrangement requirements necessitated by particular circumstances.

It is an object therefore of this invention to provide a filter apparatus comprising a plurality of units adjustably connected to one another whereby the arrangement of connection thereof may be changed to suit the particular requirements of the installation.

It is also an object of this invention to construct a filter apparatus embracing a plurality of units connected in series so that the fluid to be filtered is passed successively therethrough and with means for cutting out any one of the units without interruption of the filtering operation.

It is furthermore an object of this invention to provide a filter apparatus embracing a number of heated filter units connected in series to cause a flow of the fluid to be filtered successively therethrough, and with means controlling each of said units as well as permitting the same to be by-passed for cleaning or repair without interruption of the filtering process.

It is finally an object of this invention to construct a filter apparatus comprising a plurality of filter units connected with one another to filter a fluid by passage successively therethrough, and with said units capable of arrangement in many different relations.

The invention (in a preferred form) is illustrated in the drawings and hereinafter more fully described.

In the drawings:

Figure 1, is a side elevation of one form of filter installation embodying the principles of my invention.

Fig. 2, is a similar view with the parts in section.

Fig. 3, is a detail section on line 3—3, of Fig. 2.

Fig. 4, is a detail section taken on line 4—4, of Fig. 3.

Fig. 5, is a top plan view of the apparatus arranged differently from the manner shown in Figs. 2 and 3.

As shown in the drawings:

The filtering apparatus consists of a number of filtering tanks shown in Figs. 1 and 2, denoted respectively by the reference numerals 1, 2, 3, 4 and 5. Said tanks or containers are substantially identical in construction, each being provided with a conical cover or top 6, and in its bottom provided with a steam coil 7, which is supplied with steam from a steam line 8, and is provided with an exhaust line 9. A valve 10, is provided at the point of connection of each of the steam coils 7, with the steam supply line 8, as clearly shown in the slightly modified arrangement shown in Fig. 5. Mounted near the lower end within each of the containers or filter tanks is a screen or perforated tray member 11, to hold a quantity of filtering material spaced above and away from the steam coils 11. Another similar screen or tray 12, is provided near the upper end of each of the filter tanks or containers so that the filtering material is confined between said trays or screens. Said filtering material is composed of two different filtering materials, as for instance, cotton waste and fabric or felt, the waste being denoted by the reference numeral 13, and the fabric or felt by the reference numeral 14, and, as clearly shown in Fig. 2, the proportionate quantity of each thereof in the different filter tanks 1, 2, 3, 4 and 5, respectively, is different. The reason for this disposition of the filtering material is that the waste 13, is more pervious to the fluid, and as the fluid being filtered passes through the several stages in the filtering process in order to more effectually remove the finer traces of impurities therein, it is necessary to pass the fluid through the more impervious filtering material 14. An outlet pipe 15, is provided for each of the filter tanks or containers, and leads downwardly and is connected through an outlet valve 16, into a main filter line 17. An inlet pipe 18, communicates into the lower end of each of the filter tanks, and is provided with a valve 19, which affords communication thereof with the filter line 17. Between each of the points of connection of the respective inlet lines 18 and outlet lines 15, with the main filter line 17, a valve 20, is disposed, which is normally closed when a filter tank is in operation. A valved draw-off pipe 21, is provided on each of the inlet pipes 18, adjacent the point of connection thereof with its filter tanks, which may be opened to drain the filter when the valve 19, is closed.

The operation is as follows:

The fluid to be filtered is admitted through the main filter line 17, and passes through the open valve 19, and through the inlet pipe 18, into the lower end of the filter tank 1, thence upwardly through the filtering material therein, leaving by the outlet pipe 15, which communicates with the upper end of the filter tank above the upper screen or tray 12, therein, thence flowing downwardly through said pipe and through the open valve 16, again into the filter line 17, where it proceeds to the next inlet pipe 18, leading into the next filter tank 2, and this successive passage of the fluid being filtered takes place through all of the tanks 1 to 5, inclusive, the valves 20, throughout the main filter line 17, being closed so that the fluid is constrained to pass into each of the filter tanks in successive order.

The heat imparted to the fluid as it passes into the filtering tanks serves to facilitate the filtering thereof. When it is desirable to clean any one of the filtering tanks or replace the filtering material therein, it is only necessary to close the inlet valve 19, and the outlet valve 16, and open the by-pass valve 20, so that the filtering operation, so far as the remaining tanks are concerned, may proceed as before.

The multi-stage apparatus shown adapts itself well to many different forms of installation, as said tanks may be arranged as shown in Figs. 1 and 2, or as shown in Fig. 5, or any other arrangement to facilitate installation of the apparatus.

I am aware that various details of construction may be varied through a wide range without departing from the principles of this invention, and I therefore do not purpose limiting the patent granted otherwise than necessitated by the prior art.

I claim as my invention:

1. In a filtering apparatus the combination of a plurality of receptacles, a bed of filtering material in each receptacle, connections for passing the fluid to be filtered successively and upwardly through the filtering material in each receptacle, and means for interrupting communication of fluid to any one of said receptacles and for conducting the fluid from the receptacle preceding to the receptacle succeeding such receptacle.

2. In a filtering apparatus the combination of a main conduit for the fluid to be filtered, a plurality of receptacles each having an inlet branch leading from the main conduit to the bottom thereof and having an outlet branch leading from the top thereof to the main conduit, a bed of filtering material in each receptacle between the inlet and outlet, and a valve in each branch and in the main conduit between each inlet and outlet branch adapted to control the flow of the fluid to be filtered so as to pass the fluid successively and upwardly through the bed of filtering material in each receptacle or to by-pass any receptacle and pass the fluid from the receptacle preceding to the receptacle succeeding said by-passed receptacle.

3. In a device of the class described the combination of a plurality of receptacles each having an outlet at the top communicating with an inlet at the bottom of the succeeding receptacle, a bed of filtering material in each receptacle interposed between the inlet and the outlet so that the fluid to be filtered flows upwardly through the filtering material, a chamber at the bottom of each receptacle for supplying the fluid to be filtered uniformly to the under surface of the bed of filtering material and for collecting the material precipitated from the fluid to be filtered, and means for connecting the outlet of each receptacle with the inlet of the second succeeding receptacle so as to by-pass the intermediate receptacle.

In testimony whereof I have hereunto subscribed my name in the presence of two subscribing witnesses.

HENRY A. HILLS.

Witnesses:
 CHARLES W. HILLS, Jr.,
 EARL M. HARDINE.